United States Patent [19]
Adams et al.

[11] 3,836,230

[45] Sept. 17, 1974

[54] LIQUID CRYSTAL DISPLAY SYSTEM

[75] Inventors: James E. Adams, Ontario; James H. Becker, Penfield; Werner E. L. Haas, Webster, all of N.Y.

[73] Assignee: Xerox Corporation, Stamford, Conn.

[22] Filed: June 27, 1973

[21] Appl. No.: 374,199

[52] U.S. Cl. ............ 350/160 LC, 350/150, 350/157
[51] Int. Cl. .............................................. G02f 1/16
[58] Field of Search .............. 350/150, 157, 160 LC

[56] References Cited
UNITED STATES PATENTS

| | | | |
|---|---|---|---|
| 3,679,290 | 7/1972 | Adams et al. | 350/157 |
| 3,711,181 | 1/1973 | Adams et al. | 350/157 |
| 3,758,195 | 9/1973 | Hedman, Jr. et al. | 350/160 LC |
| 3,780,307 | 12/1973 | Saeva et al. | 350/150 X |

*Primary Examiner*—Edward S. Bauer
*Attorney, Agent, or Firm*—James J. Ralabate; David C. Petre; Gaetano D. Maccarone

[57] ABSTRACT

A liquid crystal color display system which utilizes a plurality of films or layers of optically negative liquid crystalline materials as passive light discriminating screens is disclosed. The display system may be operated in a two color mode or a three color mode and has the capability of producing various color hues. The system lends itself to operation at very high frequency.

33 Claims, 5 Drawing Figures

PATENTED SEP 17 1974          3,836,230

LIQUID CRYSTAL DISPLAY SYSTEM

BACKGROUND OF THE INVENTION

This invention relates to a liquid crystal display system and more particularly to a display system which utilizes a plurality of layers of different optically negative liquid crystal materials.

The name "liquid crystals" has become generic to liquid crystalline materials which exhibit dual physical characteristics, some of which are typically associated with liquids and others which are typically unique to solids. Liquid crystals exhibit mechanical characteristics, such as viscosities, which are ordinarily associated with liquids. The optical scattering and transmission characteristics of liquid crystals are similar to those characteristics ordinarily unique to solids. In liquids or fluids, the molecules are typically randomly distributed and oriented throughout the mass of the substance. Conversely, in crystalline solids the molecules are generally rigidly oriented and arranged in a specific crystalline structure. Liquid crystals resemble solid crystals in that the molecules of the liquid crystalline substances are regularly oriented in a fashion analogous to but less extensive than the molecular orientation and structure in a crystalline solid. Many substances have been found to exhibit liquid crystalline characteristics in a relatively narrow temperature range; but below such temperature ranges, the substances typically appear as crystalline solids and above such temperature ranges, they typically appear as liquids.

Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules are arranged in a manner which is unique to each of the three mesomorphic structures. Each of these three structures is well-known in the liquid crystal art.

Some liquid crystalline substances possess optically negative characteristics. Birefringence, also referred to as double refraction, is an optical phenomenon characteristic of many solid crystals and all liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "OPTICALLY NEGATIVE LIQUID CRYSTAL MATERIALS," as used herein, is meant those for which the extraordinary index of refraction $\eta E$ is smaller than the ordinary index of refraction $\eta o$. Cholesteric liquid crystal substances exhibit this property. For a detailed description of this phenomenon, see *Optical Crystallography*, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The half intensity bandwidth $\Delta\lambda_o$ of this wavelength band centered about $\lambda_o$ will typically be of the order of about one-tenth to one-thirtieth of the center wavelength. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite sense.

For light having wavelengths around $\lambda_o$ but not at $\lambda_o$ the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean, or "disturbed", texture. If $\lambda_o$ is in the visible region of the spectrum, the liquid crystalline film appears to have the color corresponding to $\lambda_o$ and, if $\lambda_o$ is outside the visible spectral region, the film appears colorless for viewing at normal incidence.

Depending upon the instrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having a helical structure which is righthanded in sense will transmit RHCPL. This property of cholesteric liquid crystals has been referred to as "reflective circular dichroism."

Hereinafter, these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely, a left-handed film is almost transparent to RHCPL at $\lambda_o$ and reflects LHCPL. Since plane polarized or unpolarizd light contain equal amounts of RHCPL and LHCPL, a cholesteric liquid crystal film is approximately 50 percent transmitting at $\lambda_o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2np$, it is substantially completely reflected and, after reflection, remains RHCPL. If the same light were to be directed on a mirror, the reflected light would be LHCPL.

Because of these properties and others optically negative liquid crystalline substances have been found to be highly advantageous for use in many applications such as in imaging and display techniques, optical filters, systems for detecting irregularities in surfaces, light modulation systems and others. In growing areas of technology, such as the field of liquid crystals, there is often discovered a new mode of application of the known technology. The present invention relates to a liquid crystalline display system which utilizes a plurality of films or layers of different optically negative liquid crystalline materials.

SUMMARY OF THE INVENTION

It is therefore an object of this invention to provide a novel liquid crystal display system.

It is another object of the invention to provide a display system including a plurality of films or layers of different optically negative liquid crystalline materials.

Still another object of the invention is to provide a display system which exploits the reflective circular dichroism property of optically negative liquid crystalline materials.

It is a further object of the invention to provide a display system which can be operated in a two color mode.

It is yet another object of the invention to provide a display system which can be operated in a three color mode.

Another object of the invention is to provide a display system which has the capability of reproducing various color hues.

A further object of the invention is to provide a display system which can be operated at very high frequency.

These and other objects and advantages are accomplished in accordance with the invention by providing a color display system which includes an electro-optic cell capable of changing the state of polarization of incident light, means for scanning a display screen with the incident light and a display screen comprising a plurality of films or layers of optically negative materials. The system may be operated in a two color mode or a three color mode and has the capability of producing various color hues.

BRIEF DESCRIPTION OF THE DRAWINGS

For a better understanding of the invention as well as other objects and further features thereof, reference is made to the following detailed disclosure of various preferred embodiments thereof taken in conjunction with the accompanying drawings wherein.

DESCRIPTION OF THE PREFERRED EMBODIMENT

Figure 1:
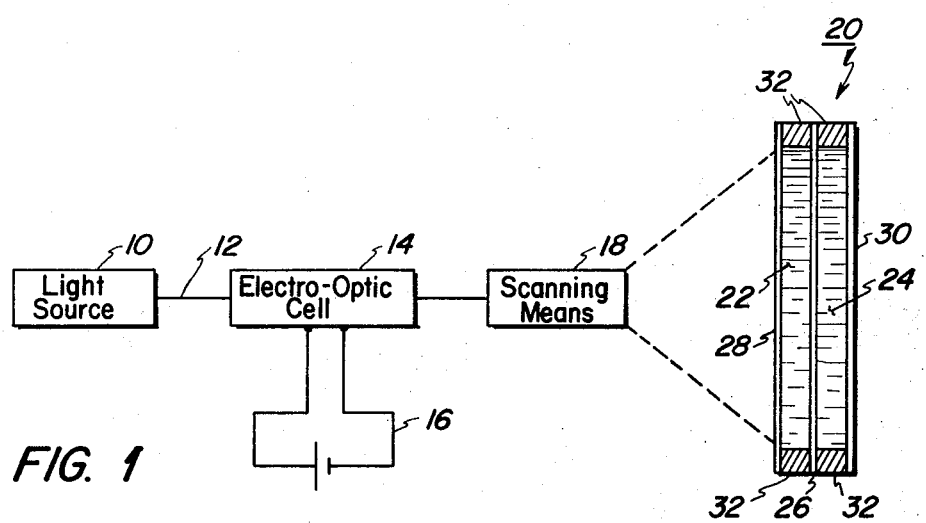
FIG. 1 is a partially schematic, cross-sectional view of one embodiment of the color display system of the invention.

In FIG. 1 a light source 10 directs a beam of light 12 through electro-optic cell 14, which is connected to a source of electrical potential 16, and in which the state of polarization of the light beam 12 is varied in accordance with a predetermined input signal. From electro-optic cell 14, the light beam is directed into a scanning means, or light beam deflector, 18, which causes the light beam to be scanned or deflected in a predetermined pattern across a display screen, generally designated 20, comprising optically negative liquid crystal films 22 and 24 arranged on either side of optional support member 26 and enclosed by optional protective layers 28 and 30 and gaskets 32. Liquid crystal films 22 and 24 are comprised of optically negative liquid crystalline materials which have opposite intrinsic rotary sense, i.e., one of the materials is right-handed and the other is left-handed, and different light reflection bands. It should be recognized that the incident light may strike the display screen at other than normal incidence. Preferably the angle of incidence will be from about 0° to about 30°. For optimum performance of the display system of the invention the incident light will be directed upon the display screen at normal incidence.

In operation of the advantageous color display system, a substantially completely linearly polarized light beam, which contains at least those wavelengths of radiation which correspond to, or are at least within, the light reflection bands of optically negative liquid crystal films 22 and 24, is directed through electro-optic cell 14 which is capable of adjusting the state of polarization of the light in accordance with some predetermined sequence of signals such that the light exiting from the cell is right-hand circularly polarized (RHCPL), left-hand circularly polarized (LHCPL), or some combination thereof. (Linearly polarized light would correspond to equal amounts of each sense). This pattern is then projected or displayed upon the display screen 20 by scanning means 18 and the image formed on the screen may be viewed in reflection or in transmission.

According to the embodiment of the invention illustrated in FIG. 1, the option of two colors, or some adjustable hue which is a combination thereof, is available at each point on the display screen. For example, consider that optically negative liquid crystal film 22 is right-handed and exhibits a light reflection band having a center wavelength $\lambda_1$ and film 24 is left-handed and exhibits a light reflection band having a center wavelength $\lambda_2$. Of course, it will be understood that the position of the films 22 and 24 in FIG. 1 is merely illustrative; the same effect would be obtained if the position of the films relative to each other were to be reversed, i.e., the left-handed film arranged in front of the right-handed film. When the electro-optic cell 14 is adjusted to produce only RHCPL, wavelengths of light at and around $\lambda_1$ which are present in the incident beam will be reflected by film 22 and none of the incident light will be reflected by film 24 since the incident light does not contain any LHCPL. When the cell 14 is adjusted to produce only LHCPL, wavelengths of light at and around $\lambda_2$ which are present in the incident beam will be reflected by film 24 and none of the incident light will be reflected by film 22 since the incident light does not contain any RHCPL. The electro-optic cell 14 may also be adjusted to produce a mixture of RHCPL and LHCPL (which could correspond to linearly polarized light or elliptically polarized light) in which case, both liquid crystal films 22 and 24 will reflect wavelengths of light at and around $\lambda_1$ and $\lambda_2$, respectively, which are present in the incident light beam and, consequently, the reflected light will represent some combination of the wavelengths at and around $\lambda_1$ and $\lambda_2$. Of course, it will be appreciated that the color hue of the light reflected by the display screen 20 is adjustable where the electro-optic cell 14 produces a combination of RHCPL and LHCPL. A range of color hues can be reflected, for example, by the technique of time averaging address. For example, in a two color display system such as is illustrated in FIG. 1 wherein, for purposes of illustration, $\lambda_1$ is in the red region of the visible spectrum and $\lambda_2$ is in the blue region, if a red to blue intensity ratio of 4:1 is desired for a total dwell time of about 20 milliseconds, optically negative liquid crystal film 22 may be made to reflect for about 16 milliseconds and liquid crystal film 24 made to reflect for about 4 milliseconds; and so forth.

The image created on the display screen 20 may be of a variety of configurations depending upon the manner in which the state of polarization of the light beam is changed and how the light beam is deflected. An image can be produced, for example, by a raster scan of the screen 20 displaying, for example, a dynamic image such as a conventional line television image. The advantageous color display system of the present invention is capable of being operated at very high speed, for example, at television frame rates since there are available electro-optic cells which can operate at frequencies in the vicinity of about $10^{10}$ cycles per second, as will be discussed in detail below herein. It is again noted that the display system may be viewed in both the transmission and reflection modes.

As stated above, the light beam 12 which is directed upon electro-optic cell 14 typically should be substantially completely linearly polarized and contain at least those wavelengths of radiation which correspond to, or are at least within, the light reflection bands of optically negative liquid crystal films 22 and 24. Hence, in the embodiment illustrated by FIG. 1, light source 10 may be any source which is capale of providing linearly polarized light, either intrinsically or in combination with other elements. Typical suitable light sources include multiple wavelength lasers which intrinsically emit substantially completely linearly polarized light; light emitting luminescent films and gas discharge arcs, e.g., Xenon arcs, which should be used with some means for removing all but linearly polarized light with a preferred direction such as a linear polarizer; and broad band sources such as incandescent light sources which are employed with band pass filters such as, for example, those described in Adams et al. U.S. Pat. No. 3,669,525. It should also be noted that the type of light source used in the inventive system controls the degree of color separation which may be obtained since each optically negative liquid crystal film reflects a band of radiation typically having a bandwidth of about 200A or more. Hence, it can be seen that the quality of the color separation which may be attained according to the present color display system is dependent to some extent upon the location of the center wavelengths of the light reflection bands of the optically negative liquid crystal films and to a larger extent, upon the quality of the light provided by the light source 10. Accordingly, it is preferred to use a laser which emits two appropriate colors as the light source 10 because of the simplicity of the element and the quality of the light it provides.

Electro-optic cell 14 may comprise any material which is capable of producing RHCPL, LHCPL or mixtures thereof in response to an electric field established by voltage from potential source 16 which may be A.C., D.C. or combination thereof. The state of polarization of the light produced by electro-optic cell 14 depends upon the voltage applied thereto. The applied electric field changes the index of refraction of the material and, consequently, changes the sense of the light output. Hence, the state of polarization of the light output may be varied in accordance with a predetermined pattern. Typical suitable materials which may be used in electro-optic cell 14 include, for example, potassium tantalate-niobate, calcium pyroniobate, dihydrogen phosphate, ammonium dihydrogen phosphate, potassium dihydrogen phosphate, mixtures thereof and others. Electro-optic cells suitable for use in the inventive color display system are commercially available from Baird-Atomic, Inc., Cambridge, Mass. As noted above, since typical electro-optic cells are presently capable of operating at frequencies up to about $10^{10}$ cycles per second, the color display system is capable of operating at very high speeds.

Scanning means, or light beam deflecting means, 18 may be any device capable of distributing the light beam across the display screen 20. Scanning means 18 may comprise an electro-optic device, an acousto-optic device, a high speed mirror system or a hybrid system such as, for example, an acousto-optic device in one direction combined with a high speed mirror system in another direction. Typical devices which are suitable for use as scanning means in the inventive color display system are commercially available from Datalight, Inc., Bloomfield, Conn. and Isomet Corp., Palisades Park, N.J.

Any suitable liquid crystalline substance or composition having optically negative properties may be used to provide liquid crystal films or layers 22 and 24. It is again noted that films 22 and 24 typically have different light reflection bands and are of the opposite handedness, i.e., one is right-handed and the other is left-handed. The liquid crystal films may be of any thickness and are preferably from about 0.5μ to about 50μ. For optimum results the liquid crystal films will have a thickness of from about 0.5 to about 20 microns.

It should be noted that the effects obtained in accordance with the present invention do not depend critically on film thickness except to the extent that the film thickness should preferably be greater than $\lambda_o$ in order to produce full intensity in the reflected light. When the films are relatively thin, i.e., when they have a thickness less than wavelength $\lambda_o$, they will typically not selectively reflect light around $\lambda_o$ as efficiently as has been previously described. When the films are of relatively great thickness, then the molecules will usually not align properly and the observed behavior will not be consistent with the optimum results attainable with the advantageous color display system. For liquid crystal films which have a $\lambda_o$ in the visible region, film thickness of from about 3 to about 10 microns will provide optimum results.

Liquid crystal films 22 and 24 may comprise any suitable cholesteric liquid crystalline material or mixture of cholesteric liquid crystalline materials. Typical cholesteric liquid crystalline materials include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl propionate, cholesteryl acetate; cholesteryl valerate; cholesteryl vaccenate; cholesteryl linolate; cholesteryl linolenate; cholesteryl oleate; cholesteryl erucate; cholesteryl butyrate; cholesteryl caproate; cholesteryl laurate; cholesteryl myriatate; cholesteryl clupanodonate; ethers of cholesterol, such as cholesteryl decyl ether; cholesteryl lauryl ether; cholesteryl oleyl ether; cholesteryl dodecyl ether; carbamates and carbonates of cholesterol, such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(butoxyethoxy) ethyl carbonate; cholesteryl-1-2-(2-methoxyethoxy) ethyl carbonate; cholesteryl geranyl carbonate; cholesteryl heptyl carbamate; and alkyl amides and aliphatic secondary amines derived from 3β-amion Δ 5-cholestene and mixtures thereof; peptides such as poly-γ-benzyl-$l$-glutamate; derivatives of beta sitosterol, such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Liquid crystal films 22 and 24 may also comprise suitable mixtures of cholesteric and nematic liquid crystalline materials. Typical nematic liquid crystalline materials which are suitable for use include: p-azoxyanisole, p-azoxyphenetole, p-butoxybenzoic acid, p-methoxycinnamic acid, butyl-p-anisylidene-p'-aminocinnamate, anisyliden-p-amino-phenylacetate, p-ethoxybenzylamino-α-methylcinnamic acid, 1,4-bis (p-ethoxybenzylidene) cyclohexanone, 4,4'-dihexyloxyazoxybenzene, 4,4'-diheptyloxazoxybenzene, anisal-p-aminoazobenzene, anisaldazine, α-benzeneazo(anisal naphthylamine), anisylidene-p-n-butylaniline, p-ethoxybenzylidene-p'-n-butylaniline, stilbenes, tolanes, and mixtures thereof.

Compositions suitable for use as liquid crystal films 22 and 24 may also comprise mixtures of cholesteric liquid crystalline materials and suitable smectic liquid crystalline substances as well as mixtures of cholesteric liquid crystalline materials and suitable non-liquid crystalline substances which are compatible with the cholesteric liquid crystal component. Typical suitable non-liquid crystalline materials include cholesterol, polyamides, lecithin and the like. Typical suitable smectic liquid crystalline substances include: n-propyl-4'-ethoxybiphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater, cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4carboxylic acids, ethyl-p-azoxycinnamate; ethyl-p-4-ethoxybenzylideneaminocinnamate; ethyl-p-azoxybenzoate; potassium oleate; ammonium oleate; p-n-octyloxy benzoic acid; the low temperature mesophase of 2-p-n-alkoxybenzylideneaminofluorenones with chain length of 7 or greater; the low temperature mesophase of p-(n-heptyl) oxybenzoic acid; anhydrous sodium stearate; thallium (I) stearate; mixtures thereof and others.

Liquid crystal films 22 and 24 may also comprise mixtures of nematic liquid crystalline materials and suitable optically active, non-mesomorphic materials which are substantially completely soluble in, or miscible with, the nematic liquid crystalline material. The non-mesomorphic, optically active material may typically comprise from about 2 to about 60 percent by weight of the composition. Of course, the amounts of the respective components in any composition suitable for use according to the advantageous color display system are controlled by the requirement that the composition should be optically negative. Typical suitable optically active, non-mesomorphic materials include: derivatives of alcohols such as l-menthol, l-linanool, d-mannitol, d-borneol and d-guercitol; derivatives of ketones such as d-camphor, d-3-methylcyclohexanone, l-menthone and l-6-isopropyl-3-cyclohexanone; derivatives of carboxylic acids such as d-citronellic acid, l-citronellic acid, d-chaulmoogric acid, l-campholic acid, l-arabonic acid, d-tartaric acid and l-ascorbic acid; derivatives of aldehydes such as d-citronellal; derivatives of alkenes such as l-β-pinene, d-silversterene, and d-limonene; derivatives of amines such as l-2-methylpiperidine; derivatives of nitriles such as d-mandelonitrile; derivatives of amides such as d-hydrocarbamide; cholesterol, derivatives of cholesterol; and mixtures of the above.

It should be noted that these optically active, non-mesomorphic materials may be used in any of the optically negative liquid crystalline compositions used in the inventive color display system. For example, these materials may be combined with cholesteric liquid crystalline materials to form optically negative liquid crystalline composition suitable for use according to the invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly with or without heating the mixed components above or below the isotropic transition temperature.

The above lists of typical suitable materials are intended to encompass mixtures of the above. These lists are intended to be representative only and are not to be construed as being exhaustive or limiting the invention to the specific materials recited. Although any liquid crystalline composition having optically negative characteristics is suitable for use in the present color display system, it should be recognized that the various different substances or compositions which are suitable for use possess the requisite properties at some specific temperature range which may be at or near room temperature. Typically, the color display system will be operated at or near room temperature and it is, therefore, preferred to use liquid crystalline compositions or substances which have a liquid crystal state at or near room temperature.

It should also be noted here that although it is preferred to use optically negative liquid crystalline compositions which have a $\lambda_o$ value in the visible region, it is possible to use compositions which have a $\lambda_o$ value in the infrared or ultraviolet regions. In the latter instances the display system would typically include some means for converting the image to a visible image so that it may be viewed by an observer.

The gasket material 32 in FIG. 1 which is used where desired to confine the liquid crystalline is typically chemically inert and a good sealant. Any material possessing the requisite characteristics may be used such as, for example, clear plastics such as polyvinylfluoride, polytetrafluoroethylene, polyethylene terephthalate, etc. It should be noted here, however, that in some embodiments of the invention the gasket material may be required to be electrically insulating, i.e., typically having a bulk resistivity above about $10^{14}$ ohm - cm. According to a preferred embodiment of the invention the display screen used will include means for shifting the $\lambda_o$ value of the liquid crystal films therein, either individually or in combination. It is known in the art that the pitch, and consequently the $\lambda_o$ value, of optically negative liquid crystalline materials is sensitive to various stimuli such as electric fields, magnetic fields, shear, pressure, temperature, chemical vapors, etc. Thus, it will be appreciated that where the display screen includes a means for shifting the $\lambda_o$ value of the optically negative liquid crystal films the display screen can be conveniently adapted for use with light sources which emit various different wavelengths of light. A display screen illustrating this embodiment is shown in FIG. 5.

Figure 5:
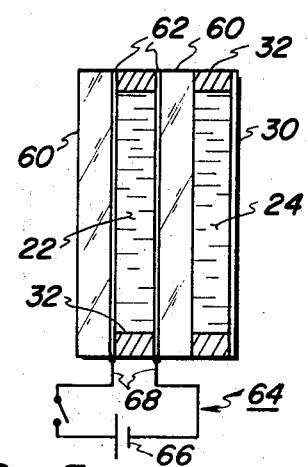
FIG. 5 is a partially schematic, cross-sectional view of an embodiment of a display screen including means to shift the light reflection band of one liquid crystal film.

Referring now to FIG. 5 there is seen a display screen which is similar to that illustrated in FIG. 1 with the exception that protective layer 28 and support member 26 in the FIG. 1 embodiment are replaced with substantially transparent, isotropic electrodes which comprise in this illustrative instance substantially transparent isotropic support plates 60 having substantially transparent conductive coating 62 upon the contact surface. A field can be created across the electrodes by an external circuit 64 which typically comprises a source of potential 66 which is connected across the two electrodes through leads 68. The circuit 64 may also contain suitable switching means. The potential source may be either AC, DC, or a combination thereof.

The electrodes may be of any suitable transparent and isotropic conductive material. Typical suitable transparent isotropic conductive electrodes include glass substrates having substantially transparent and continuously conductive coatings of conductors such as tin, indium oxide, aluminum, chromium, tin oxide, or any other suitable conductor. These substantially transparent conductive coatings are typically evaporated onto the more insulating transparent substrate. NESA glass, a tin oxide coated glass manufactured by the Pittsburg Plate Glass Co., is a commercially available example of a typical transparent, conductive electrode material.

For ease of illustration only optically negative liquid crystal film 22 in FIG. 5 has been shown as being sandwiched between a pair of electrodes. Alternatively and preferably, optically negative liquid crystal film 24 may also be arranged between a pair of electrodes in a similar manner. It should be noted here that the electrodes need not be all substantially transparent in all the embodiments where they are used. For example, if liquid crystal film 34 in FIG. 5 were sandwiched between a pair of electrodes and the display screen were viewed in reflection the rear electrode could be opaque. Of course, it will be apparent that any of the embodiments of the display screens used in the inventive color display system may include means for shifting the $\lambda_o$ value of the optically negative liquid crystal films.

Support member 26 may be any suitable material which is optically isotropic and transparent to the incident wavelengths of radiation. Typical suitable materials include fused silica, glass and any other materials having the requisite optical and physical properties. It is preferred to utilize materials which have an index of refraction about the same as that of the liquid crystal films to minimize reflection loss of light. Of course, it should be noted that the device configuration shown in FIG. 1 is intended to be illustrative only. The liquid crystal films 22 and 24 need not be adjacent opposite surfaces of the same support member as is shown in FIG. 1; in another embodiment the liquid crystal films may be arranged independently of each other and spatially separated. Support member 26 typically has a thickness in the range of from less than 1 micron to about 100 microns or more.

It should also be noted here that in some embodiments of the invention the support member 26 may play an active role in the display screen performance, for example, via interference effects, polarization effects or birefringence effects. In these embodiments the support member typically will be from about one half micron to about 5 microns thick.

The liquid crystal films 22 and 24 are typically tacky, soft, viscous, glassy or liquid and therefore it is preferred to have the films overcoated or encapsulated, with thin protective layers 28 and 30, respectively. The purpose of the protective layers is to keep the liquid crystal films confined and free of any contamination.

Hence, the protective layers may be of any suitable material, flexible or rigid, which is isotropic, optically transparent to the incident radiation and which is non-reactive with the liquid crystal films or any other components of the device. It is preferred to use materials which have an index of refraction about the same as that of the liquid crystal films to minimize loss of light. Protective layers 28 and 30 typically have thickness of from about 0.25 to about 10 mils. It should be noted here that where the display screen is viewed in reflection, layer 30 may comprise a dark colored material so as to improve contrast.

Figure 2:
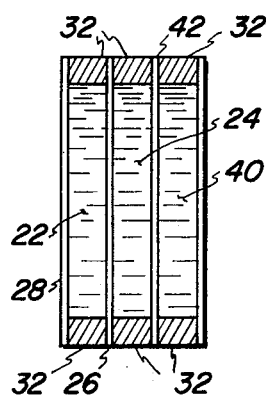
FIG. 2 is a partially schematic, cross-sectional view of a display screen utilized according to a preferred embodiment of the color display system of the invention.

FIG. 2 illustrates a preferred embodiment of a display screen suitable for use in the advantageous color display system of the invention. The display screen shown in FIG. 2 is similar to display screen 20 in FIG. 1 with the exception that the former includes an additional liquid crystal film and an optional filter. Thus, in the embodiment illustrated in FIG. 2, elements which are common to the display screen shown in FIG. 1 are identified by the same numeral.

Referring now to FIG. 2, there is seen a display screen which includes three optically negative liquid crystal films 22, 24 and 40, respectively. Liquid crystal films 24 and 40 are separated by optional filter 42. The incorporation of the liquid crystal film 40 in the display screen increases the range of color hues which can be observed at any point on the screen. Liquid crystal film 40 may comprise any of the materials described in detail above herein as being suitable for use as films 22 and 24 and may be right-handed or left-handed. Moreover, liquid crystal film 40 may have a $\lambda_o$ value which is less than, greater than, or intermediate between, the $\lambda_o$ values of films 22 and 24. According to a preferred embodiment liquid crystal films 22, 24 and 40 would have $\lambda_o$ values in the red, blue and green regions of the visible spectrum, respectively. The light source in a color display system employing the display screen illustrated in FIG. 2 would, of course, emit wavelengths of light which are reflected by the liquid crystal film 40.

According to this embodiment, it would be possible to mix green light with red and blue light in the light reflected at any point on the display screen. It is to be noted, however, that this result will only occur when the light impinging on the display screen has at least some component which has the appropriate state of polarization. For example, if liquid crystal film 40 is right-handed, it will only reflect RHCPL in the region of its reflection band and, consequently, wavelengths of light in the green would only be mixed in with the total light reflected at any point on the display screen when the light reaching the screen is completely RHCPL or contains at least some component which is RHCPL. The converse is true in the instance where liquid crystal film 40 is left-handed. As was discussed above herein, electro-optic cell 14 shown in FIG. 1 is capable of providing RHCPL, LHCPL or combinations thereof in response to varying applied voltages.

As aforesaid, it is possible to use filters in the display screen to improve device performance. These filters may be used to selectively attenuate various wavelengths of light or to attenuate all wavelengths of light equally. In the embodiment illustrated in FIG. 2 optional filter 42 is incorporated in the display screen to reduce the amount of light contributed by liquid crystal film 40 to the total light reflected at any point on the display screen. According to the preferred embodiment where liquid crystal films 22, 24, and 40 have $\lambda_o$ values in the red, blue and green regions respectively, filter 42 would preferably be one which substantially attenuates red and blue light and, to a lesser degree, green light. It should be noted that filter 42 may be a neutral density filter, i.e., one which attenuates all wavelengths of light equally. The neutral density filter may be a developed silver halide emulsion, partially metallized glass or a screen or other pattern comprised of opaque areas and light transmitting windows. It should also be recognized here that various corrective filters can be used at any point in the optical path, within or outside of the optical screen, to improve color rendition.

Figure 3:
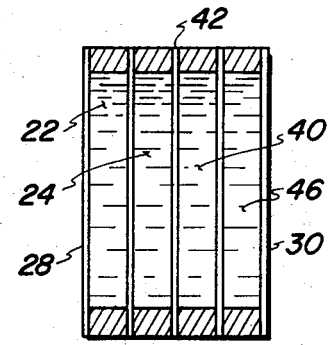
FIG. 3 is a partially schematic, cross-sectional view of another embodiment of a display screen utilized according to a preferred embodiment of the color display system of the invention.

FIG. 3 illustrates another preferred embodiment of a display screen suitable for use in the advantageous color display system. The display screen shown in FIG. 3 is similar to the display screen shown in FIG. 2 with the exception that the former includes an additional liquid crystal film 46. Liquid crystal film 46 is selected so as to have substantially the same light reflection band as that of liquid crystal film 40 but to have the opposite handedness. For example, where film 40 is right-handed, then film 46 will be a left-handed film. It will be recognized that, according to this embodiment wavelengths of light reflected by liquid crystal films 40 and 46 will always be present in the light reflected from any point on the display screen when the incident light beam includes these appropriate wavelengths. It should be noted that this result is obtained irrespective of the particular state of polarization imparted to the incident light by the electro-optic cell at any point. Providing liquid crystal films with substantially the same light reflection band and opposite handedness may be conveniently accomplished by forming mixtures of liquid crystal substances. It has been found that the pitch of two component mixtures of certain cholesteric liquid crystalline materials is a strong function of composition. Over a wide range of materials, the pitch (and, consequently, the light reflection band) of a mixture can be accurately represented by a weighted average of the ingredients. Further, if components with opposite intrinsic screw sense are mixed, there will exist one composition corresponding to no net rotation or infinite pitch. On either side of this composition, the other compositions will either be right-handed or left-handed. Thus, liquid crystal films having any desired light reflection band and handedness may be prepared by resort to this technique. A detailed discussion of this phenomenon is found in *Liquid Crystals and Ordered Fluids*, J. E. Adams, W. Haas and J. J. Wysocki, page 463, Plenum Press, 1970.

Figure 4:
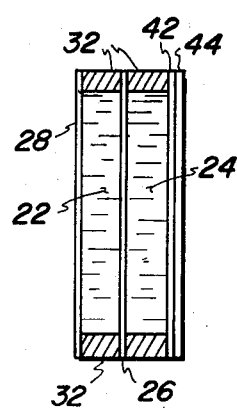
FIG. 4 is a partially schematic, cross-sectional view of another prefered embodiment of a display screen used according to the invention.

FIG. 4 illustrates another preferred embodiment of a display screen suitable for use in the inventive color display system. In the embodiment shown in FIG. 4 there is provided a reflecting surface 44 to reflect incident light. In this manner any wavelengths of light emitted by the light source may be incorporated in the light reflected at any point on the display screen. Again it is pointed out that optional filter 42 may selectively attenuate various wavelengths of light or it may be a neutral density filter. According to a preferred embodiment wherein the light source emits wavelengths in the red, blue and green regions and optically negative liquid crystal films 22 and 24 have $\lambda_o$ values in the red and blue respectively, optional filter 42 preferably is one which substantially completely absorbs red and blue light and is substantially completely transparent to green light. It is again noted here that any of the display screens used in the display system may include means for shifting the $\lambda_o$ value of one or more of the optically negative liquid crystal films.

From the foregoing it can be recognized that the advantageous color display system of the present invention is capable of achieving readout of all three primary colors. However, it should be noted that the system does not function as a full color system since an arbitrary mixture of all three colors cannot be achieved. For example, it is possible according to the embodiments illustrated in FIGS. 2 and 3 and 4 to obtain any desired mixture of red and blue light in the reflected light by controlling the amounts of RHCPL and LHCPL present in the incident beam. However, in either of these embodiments, the amount of green light present in the light reflected by the display screen could not be arbitrarily changed to any desired value independently of the amount of red and blue light present.

It should be noted that the display screens employed in the novel color display system can have any number of optically negative liquid crystal films. Of course, as the total number of liquid crystal films in any display screen becomes larger, the mixture of light obtained as readout at any point on the screen becomes more complicated with respect to any particular state of polarization of the light produced by electro-optic cell 14 in response to any applied voltage. Nevertheless, for any embodiment where the wavelengths of the incident light and the state of polarization thereof are known, it is possible to determine what mixture of light will be reflected from any point on the display screen.

The following example further specifically defines the present inventive liquid crystal color display system. It should be recognized that the example is for purposes of illustration only and the invention is not limited to the procedures, conditions and materials recited therein. All parts and percentages are by weight unless otherwise indicated.

EXAMPLE

A display screen is constructed by providing approximately 25 micron thick films of a 9:1 mixture of cholesteryl chloride:cholesteryl nonanoate (a right-handed composition having a $\lambda_o$ of about 6000A) and a 1:3 mixture of cholesteryl chloride and cholesteryl nonanoate (a left-handed composition having a $\lambda_o$ value of about 5000A) on opposite sides of a microscope slide. The free surfaces of the liquid crystal films are covered with microscope slides.

Light from a 25 watt concentrated zirconium arc lamp connected to a DC 50 watt power supply is directed upon the display screen through an electro-optic cell made up of a GlanThompson polarizer and a quarter wave plate. The electro-optic cell is mechanically rotated to change the state of polarization of the incident light. At one orientation of the electro-optic cell the display screen reflects red light. The electro-optic cell is rotated 90° and the display screen reflects green light.

It will be understood that various other changes in the details, materials, steps and arrangements of elements which have been described herein and illustrated in order to explain the nature of the invention will occur to and may be made by those skilled in the art upon a reading of this disclosure and such modifications are intended to be included within the principle of the invention and the scope of the claims.

What is claimed is:

1. A liquid crystalline color display device comprising
    a. means for providing substantially completely linearly polarized light;
    b. electro-optic means capable of changing the state of polarization of light positioned in the path of light provided by said light providing means;
    c. scanning means for distributing light across a display screen, said scanning means positioned in the path of light exiting from said electro-optic means; and
    d. a display screen positioned to receive light from said scanning means, said display screen comprising at least two films of optically negative liquid crystalline materials having a light reflection band with center wavelength $\lambda_o$, wherein the optically negative liquid crystalline material comprising at least one of said films has a $\lambda_o$ and intrinsic rotatory sense different than those of the optically negative liquid crystalline material comprising the other said film.

2. The display device as defined in claim 1 wherein said display screen further includes means for shifting the location of the light reflection band of at least one of said films of optically negative liquid crystalline material.

3. The display device as defined in claim 2 wherein at least one of said films of optically negative liquid crystalline material of said display screen is arranged between a pair of electrodes at least one of which is substantially transparent and isotropic.

4. The display device as defined in claim 1 wherein said display screen further includes at least one optical filter element.

5. The display device as defined in claim 4 wherein said display screen includes a neutral density filter.

6. The display device as defined in claim 1 wherein at least two of said optically negative liquid crystal films of said display screen are provided on opposite surfaces of a substantially transparent isotropic support member.

7. The display device as defined in claim 6 wherein said support member is from about 0.5 to about 5 microns in thickness.

8. The display device as defined in claim 1 wherein said means for providing substantially completely linearly polarized light comprises a multiple wavelength laser.

9. The display device as defined in claim 1 wherein said optically negative liquid crystalline films each have a thickness in the range of from about 0.5 micron to about 50 microns.

10. The display device as defined in claim 1 wherein said optically negative liquid crystalline films each have a thickness in the range of from about 0.5 micron to about 20 microns.

11. The display device as defined in claim 1 wherein the optically negative liquid crystalline materials comprising each said film of said display screen have a $\lambda_o$ in the visible region of the electromagnetic spectrum.

12. The display device as defined in claim 11 wherein said display screen comprises three films of optically negative liquid crystalline materials, said liquid crystalline materials having a $\lambda_o$ in the red, blue and green regions of the visible spectrum respectively.

13. The display device as defined in claim 12 wherein said display screen further includes at least one optical filter element.

14. The display device as defined in claim 11 wherein said display screen comprises two films of optically negative liquid crystalline materials, at least one optical filter element and a reflecting surface.

15. The display device as defined in claim 11 wherein said display screen comprises four films of optically negative liquid crystalline materials, and wherein two of said films comprise optically negative materials having substantially the same $\lambda_o$ but opposite intrinsic rotatory sense.

16. The display device as defined in claim 15 wherein said display screen further includes at least one optical filter element.

17. The display device as defined in claim 11 wherein said optically negative liquid crystalline films each have a thickness in the range of from about 3 microns to about 10 microns.

18. A method for providing a color display comprising
   a. providing a display screen comprising at least two films of optically negative liquid crystalline materials having a light reflection band with center wavelength $\lambda_o$, wherein the optically negative liquid crystalline mate .l comprising at least one of said films has $\lambda_o$ and intrinsic rotatory sense different than those of the optically negative liquid crystalline material comprising the other said film;
   b. providing a beam of substantially completely linearly polarized light, said light including wavelengths corresponding to the $\lambda_o$ of the optically negative liquid crystalline materials comprising at least two of said films;
   c. changing the state of polarization of said light in accordance with some predetermined sequence of signals; and
   d. directing said light upon said display screen in a pattern corresponding to a desired image whereby an image is observed.

19. The method as defined in claim 18 wherein said light is directed upon said display screen at normal incidence.

20. The method as defined in claim 18 wherein said substantially completely linearly polarized light is provided by means comprising a multiple wavelength laser.

21. The method as defined in claim 18 wherein said display screen further includes at least one optical filter element.

22. The method as defined in claim 21 wherein said display screen includes a neutral density filter.

23. The method as defined in claim 18 wherein at least two of said optically negative liquid crystal films of said display screen are provided on opposite surfaces of a substantially transparent isotropic support member.

24. The method as defined in claim 23 wherein said support member is from about 0.5 to about 5 microns in thickness.

25. The method as defined in claim 18 wherein said optically negative liquid crystalline films each have a thickness of the range of from about 0.5 micron to about 50 microns.

26. The method as defined in claim 18 wherein said optically negative liquid crystalline films each have a thickness in the range of from about 0.5 micron to about 20 microns.

27. The method as defined in claim 18 wherein the optically negative liquid crystalline materials comprising each said film of said display screen have a $\lambda_o$ in the visible region of the electromagnetic spectrum.

28. The method as defined in claim 27 wherein said display screen comprises three films of optically negative liquid crystalline materials, said liquid crystalline materials having a $\lambda_o$ in the red, blue and green regions of the spectrum respectively.

29. The method as defined in claim 28 wherein said display screen further includes at least one optical filter element.

30. The method as defined in claim 27 wherein said display screen comprises two films of optically negative liquid crystalline materials, at least one optical filter element and a reflecting rear surface and wherein said image is viewed in reflection.

31. The method as defined in claim 27 wherein said display screen comprises four films of optically negative liquid crystalline materials and wherein two of said films comprise optically negative materials having substantially the same $\lambda_o$ but opposite intrinsic rotatory sense.

32. The method as defined in claim 31 wherein said display screen further includes at least one optical filter element.

33. The method as defined in claim 27 wherein said optically negative liquid crystalline films each have a thickness in the range of from about 3 microns to about 10 microns.

* * * * *